(12) United States Patent
Callaghan et al.

(10) Patent No.: US 9,256,854 B2
(45) Date of Patent: Feb. 9, 2016

(54) AUDIBLE PRESENTATION AND VERBAL INTERACTION OF HTML-LIKE FORM CONSTRUCTS

(75) Inventors: Patrick Callaghan, Vestal, NY (US); Stephen V. Feustel, Endwell, NY (US); Michael J. Howland, Endicott, NY (US); Steven M. Pritko, Endicott, NY (US)

(73) Assignee: International Business Machines Corporation, Armonk, NY (US)

(*) Notice: Subject to any disclaimer, the term of this patent is extended or adjusted under 35 U.S.C. 154(b) by 2355 days.

(21) Appl. No.: 12/141,450

(22) Filed: Jun. 18, 2008

(65) Prior Publication Data
US 2008/0255838 A1 Oct. 16, 2008

Related U.S. Application Data

(63) Continuation of application No. 09/668,212, filed on Sep. 22, 2000, now Pat. No. 7,406,657.

(51) Int. Cl.
*G06F 17/00* (2006.01)
*G06Q 10/10* (2012.01)

(52) U.S. Cl.
CPC ..................... *G06Q 10/10* (2013.01)

(58) Field of Classification Search
None
See application file for complete search history.

(56) References Cited

U.S. PATENT DOCUMENTS

| | | | |
|---|---|---|---|
| 4,763,356 A * | 8/1988 | Day et al. | 379/368 |
| 5,101,375 A | 3/1992 | Goldhor | |
| 5,231,670 A | 7/1993 | Goldhor et al. | |
| 5,367,619 A | 11/1994 | Dipaolo et al. | |
| 5,493,608 A | 2/1996 | O'Sullivan | |
| 5,748,186 A | 5/1998 | Raman | |
| 5,819,220 A | 10/1998 | Sarukkai et al. | |
| 5,864,340 A | 1/1999 | Bertram et al. | |
| 5,874,939 A * | 2/1999 | Galvin | 345/156 |
| 5,884,262 A | 3/1999 | Wise et al. | |
| 5,890,123 A * | 3/1999 | Brown et al. | 704/270.1 |
| 5,915,001 A * | 6/1999 | Uppaluru | 379/88.22 |
| 5,953,392 A | 9/1999 | Rhie et al. | |
| 6,125,376 A * | 9/2000 | Klarlund et al. | 715/205 |
| 6,157,705 A | 12/2000 | Perrone | |
| 6,263,051 B1 | 7/2001 | Saylor et al. | |
| 6,269,336 B1 | 7/2001 | Ladd et al. | |
| 6,349,132 B1 | 2/2002 | Wesemann et al. | |
| 6,400,806 B1 | 6/2002 | Uppaluru | |
| 6,600,736 B1 | 7/2003 | Ball et al. | |
| 6,654,722 B1 * | 11/2003 | Aldous et al. | 704/270.1 |
| 7,080,315 B1 | 7/2006 | Lucas et al. | |
| 2003/0093281 A1 | 5/2003 | Geilhufe et al. | |
| 2006/0206591 A1 | 9/2006 | Lucas et al. | |

OTHER PUBLICATIONS

Lemay et al., "Laura Lemay's Web Workshop JavaScript", Sams.net, 1996, p. 116-118, 130-139.

* cited by examiner

*Primary Examiner* — Keith Bloomquist
(74) *Attorney, Agent, or Firm* — Schmeiser, Olsen & Watts, LLP; Elissa Y. Wang

(57) ABSTRACT

A method of synchronizing an audio and visual presentation in a multi-modal browser. A form is transmitted over a network having at least one field requiring user supplied information to a multi-modal browser. Blank fields within the form are filled in by user who provides either verbal or tactile interaction, or a combination of verbal and tactile interaction. The browser moves to the next field requiring user provided input. Finally, the form exits after the user has supplied input for all required fields. The method also provides a synchronized verbal and visual presentation by said browser by having the headings for the fields to be filled out and typing in what the user says.

11 Claims, 6 Drawing Sheets

AUDIBLE PRESENTATION AND VERBAL INTERACTION OF HTML-LIKE FORM CONSTRUCTS

CROSS REFERENCE TO RELATED APPLICATION

This is a continuation application of pending U.S. patent application Ser. No. 09/668,212, which was filed on Sep. 22, 2000.

BACKGROUND OF THE INVENTION

1. Field of the Invention

The present invention generally relates to filling out Hyper-Text Markup language-like (HTML-like) forms that are sent to a multi-modal (e.g., audio-visual) browser, and in particular, to providing a synchronized presentation of the verbal and visual components of a form having fields requiring user provided input, and allowing the user to fill in the form with verbal or tactile (e.g., visual/manual) interaction, or a combination thereof.

2. Background Description

Known prior art browsers do not provide users with the ability to fill out the form by using either verbal or tactile interaction, or a combination thereof. Users must fill out a form either manually, such as by using a keyboard, mouse or touchscreen, or verbally. Users can not, however, use both in filling out a single form or set of related forms.

In the standard visual presentation of a form, the user is free to navigate the form, as it is being filled out, via a mouse, keyboard, touch screen or the like. Because this is difficult with an audio presentation, a conversational model may be provided where the form consists of numerous questions that are filled in sequentially (answering one question leads to the next). This method, however, hinders the tactile interaction with the form in known prior art browsers.

U.S. Pat. No. 5,819,220 to Surukkai et al., entitled "Web Triggered Word Set Boosting for Speech Interfaces to the World Wide Web", concerns performing word analysis on the recent past content and using this information to enhance the speech recognition of future commands.

U.S. Pat. No. 5,864,340 to Bertram et al., entitled "Mobile Client Computer Programmed to Predict Input", concerns "predictive widgets", which is an algorithm that attempts to predict the default values for various form fields.

U.S. Pat. No. 5,748,186 to Raman, entitled "Multimodal Information Presentation System", concerns obtaining information, modeling it in a common intermediate representation, and providing multiple ways, or views, into the data. However, the patent is not concerned with a multi modal method of presenting and the explicit/implicit navigation of an HTML form construct.

SUMMARY OF THE INVENTION

It is therefore an object of the present invention to provide a Embedded Browser Markup Language-based (EBML-based) multi-modal browser (hereinafter "multi-modal browser") that serves a form having one or more fields via a synchronized verbal/visual presentation and allows a user to fill in the form with verbal and/or tactile interaction.

It is another object of the present invention to provide a multi-modal browser that receives forms sent by an application where the forms utilize EBML, which is based on the existing HTML form paradigm, and need not be aware that a multi-modal browser is being used.

Specifically, the present invention is intended to minimize the responsibility on the application for dealing with the multi-modal aspect of the presentation. Thus, if the form were presented using a conversational mode (question-answer), the application would not be able to generate the markup using a single form with any similarity to standard HTML forms. Since those skilled in the art know how HTML forms are constructed, this browser intends to use this general structure to make the form multi-modal for the application developer where ever possible.

The present invention enables a multi-modal browser to handle EBML (HTML-like) forms that have one or more form elements, or fields, that are presented to a user. The application can send the EBML forms to the multi-modal browser without a detailed understanding of how the multi-modal browser will perform the verbal and visual presentation of the form. The present invention also audibly presents the information to users in a field-by-field manner as well. In addition, audible navigation among the fields is also provided. The multi-modal browser serves the form via a synchronized verbal/visual presentation, and allows a user to fill in the form via either verbal or tactile interaction, or a combination thereof. The user then submits the form through tactile interaction (e.g., by pressing a simulated button) or verbal interaction (e.g., by uttering the appropriate verbal command). Optionally, the form may also be submitted automatically (i.e., without user interaction) after all required fields have been specified.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
FIG. 1 is an example of a form that may appear on a multi-modal web browser of the present invention and uses text input fields.

FIG. 1 shows a typical form 100 that may be presented to a user via the multi-modal browser of the present invention. A form 100 is comprised of a collection of form elements, or fields, 102 and 104. In this particular form, the Name 102 and Customer's Problem 104 fields are presented. The code that generated form 100 is as follows:

```
<EBML>(1)
  <BODY>(2)
    Please complete the following form.(3)
    <FORM ACTION="/post/p_servlet" REREAD="10000"
    METHOD="POST"> (4)
      <INPUT TYPE="HIDDEN" NAME="hid1"
      VALUE="hid-value"/>(5)
      <BR/>(6)
      <P>(7)
```

-continued

```
        <SILENT>Name:</SILENT>(8)
        <INPUT TYPE="TEXT" NAME="cust_name"
        REREAD="5000">(9)
            <INVISIBLE>What is the customer name?
            </INVISIBLE> (10)
        </INPUT>(11)
    </P>(12)
    <P>(13)
        <SILENT>Customer's Problem:</SILENT>(14)
        <INPUT TYPE="TEXT" NAME="problem"
        REREAD="5000">(15)
            <INVISIBLE>What is the customer problem?
            </INVISIBLE>(16)
        </INPUT>(17)
    </P>(18)
    <INPUT TYPE="SUBMIT"/>(19)
    </FORM>(20)
    This message is after the form.(21)
    </BODY>(22)
</EBML>(23)
```

The <FORM> element shown in line (4) contains general form settings, including a time to delay before rereading the form element. The hidden data allows application developers to include inert information (information having no visual of audible presence during the presentation) within the form. This information is returned during processing. A text input field for the customer name and problem is provided in lines (9) and (15), respectively. The <INPUT> field contains, among other things, information describing the delay before the construct is to be reread. A submit button is also provided in line (19) to activate the form.

Referring again to FIG. 1, at least one of the fields (102 or 104) should be filled in prior to submitting the form by either tactile means such as a mouse or keyboard, or by verbal commands recognized by the multi-modal browser to transmit the form. Those skilled in the art of designing Web sites (i.e., the World Wide Web (WWW) portion of the Internet, or simply "the Web") will realize that a pull down menu that provides users a list from which to select could also have been provided for any or each of fields 102 or 104. It will also be apparent to those skilled in the art that form 100 shown in FIG. 1 is illustrative only and that an infinite variety of forms can be used. The form 100 itself is also considered a form element.

The present invention provides a method and system for explicitly and implicitly navigating the form 100 and the fields 102 and 104 contained within form 100. To navigate the form 100 by using verbal commands, the multi-modal browser of the present invention reads the audio elements (lines 10 and 16) of the fields to be filled in, and types what the user says. The multi-modal browser would thus read the Name 108 prompt (line 10) and the Customer's Problem 110 prompt (line 16).

The multi-modal browser also understands standard verbal commands that may be issued by a user whenever a form is being filled in. For example, in a preferred embodiment, the multi-modal browser may understand verbal commands such as SKIP, REVIEW, SUBMIT, CANCEL and RESET. The SKIP command will skip from a present field to the next field. The REVIEW command will review the form to ensure that all fields contain information. The SUBMIT command submits the form to the application program for processing. The CANCEL cancels, or erases, information currently within a field. The RESET command directs the browser to clear the form and reprocess it from the top (i.e., reread the form to the user). It should be understood by those skilled in the art that other verbal commands can also be provided.

In a preferred embodiment, the default mode for the multi-modal browser will be to read the fields 102 and 104 in the order in which they are presented on the form 100. However, the user can also fill in fields 102 and 104 in any order via the SKIP command and, if desired, subsequently return to any field that has been skipped. The multi-modal browser will first default to field 102 corresponding to the Name 108 heading. A user can then say "SKIP" to have the multi-modal browser skip field 102 so that the multi-modal browser moves to field 104 before any data is provided as input to field 102.

Additionally, users can select which fields 102 and/or 104 to fill in via tactile interaction such as by a touchscreen, mouse, or keyboard. The multi-modal browser of the present invention thus allows for input to the fields within the form 100 via both verbal and tactile modes, or a combination thereof. For example, a user could provide input to field 102 verbally, and then select field 104 via a touch screen and provide verbal input. Alternately, a user could use the SKIP command to verbally skip field 102, and then select field 104 (or another field) via the touchscreen and use the keyboard to enter the information.

Figure 2:
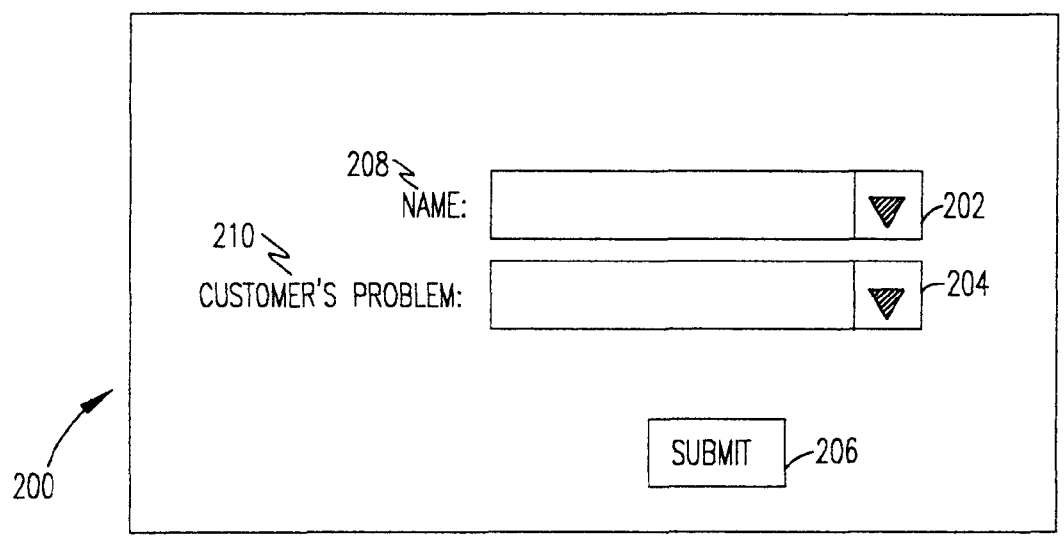
FIG. 2 is a example of a form that is synchronized with an audio component and uses selection boxes.

Referring now to FIG. 2, the audio-visual modes of the multi-modal browser are synchronized as follows. If a selection box 202 is encountered during the audio presentation of the form, the visual representation of the selection box 202 may expand, or become enlarged, to display alternatives for selection. It should be noted that not all form elements need to "expand" and "contract". Form elements may also, for example, change color to indicate that they are "in scope" when the audio progression falls to them. Once the audio presentation corresponding to the selection box 202 is completed and the audio presentation moves on to the next form element 204, the visual representation of selection box 202 contracts, and the selection box 204 then expands or becomes enlarged. This tight coupling of the audio and visual presentation allows a user to quickly glance at the visual component should the audio presentation prove inadequate, and vice-versa. A common example of this is in the pronunciation of customer names. If the browser reads a customer name, the speech engine may mispronounce it. A quick glance to the visual component, however, allows the user to verify the intended information.

In addition to the visual/audio synchronization provided, the audio presentation is affected by the value currently specified in the subject form field. If a form field currently contains a value (either because it was specified in the markup language to contain an initial value or because it was filled due to previous interaction with the user) its current value will be audibly presented to the user, followed by a short pause.

After the audible presentation of the value for field 202 and the ensuing pause, the audio progression will continue to the next field 204 in the form 200. Then, if no value has been previously specified for subject field 204 and a value is not specified within the specified time limit, the audio progression will return (i.e., loop) to the beginning of form element 204, and re-present any prompting information associated with form element 204. This, in effect, re-asks the user to answer the specified question and provide the requested information.

When the last field 204 of the form 200 is reached by the audio progression, a pause is generated. Since the entire form is also considered a form element, the audio progression loops back to the top of the form (e.g., to field 202) after the pause expires. This continues until a user uses a verbal command to either SUBMIT, CANCEL or RESET the form, or uses a tactile input method to accomplish the same thing.

Each form element 202 and 204 has a distinct behavior that it exhibits when the audio progression enters and exits the respective element. Providing input into a form element during the audio progression causes local verbal commands specific to the element to come into "scope" should it support any verbal command interaction. For example, the KEYBOARD command is enabled when a form field needing a keyboard is encountered (i.e., a text input field), the RECORD VOICE and PLAY BACK commands are enabled when a form field that allows the user to record voice or play back a recorded voice is encountered, and the SELECT IT command is enabled when a form selection box is encountered. When the audio progression moves beyond a form element, local scope commands associated with that particular form element are then disabled. Also, there are form "scope" commands in which some elements register form scope verbal commands. Typical form scope commands are CANCEL, SUBMIT and RESET, as previously discussed, which allow the form node in the tree to do the registration and manage the enablement and disablement of the command set. In addition, as the form is audibly presented to the user, the visual component of the form remains synchronized with the audio presentation, as previously discussed.

Figure 3:
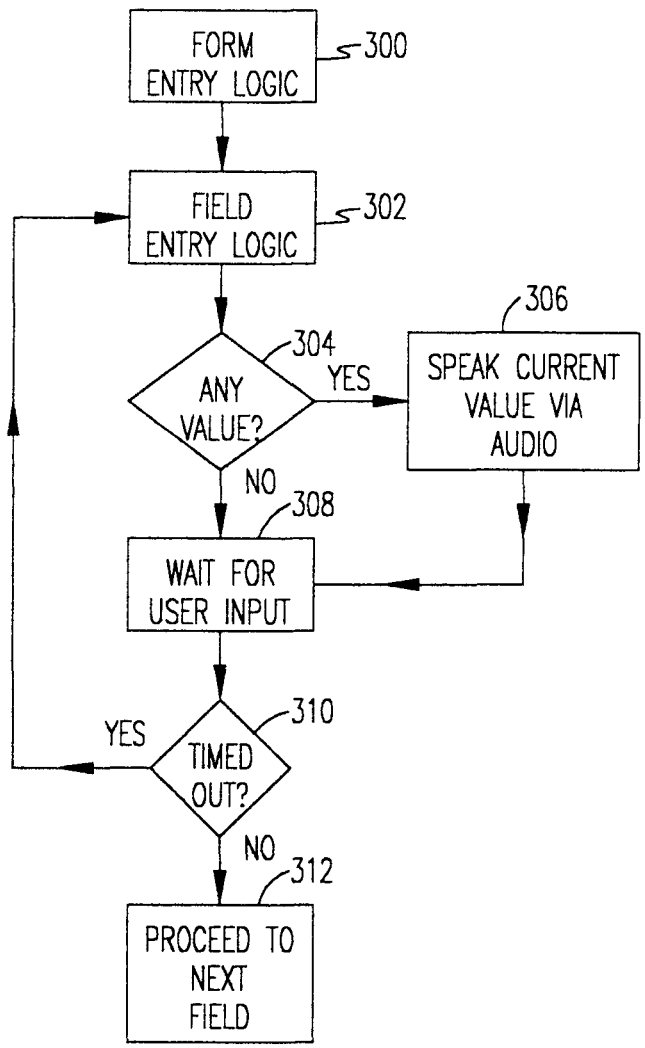
FIG. 3 is a flow diagram of the logic that couples the audio and visual components.

The logic associated with the above-described coupling of the audio and visual components is shown in FIG. 3. In function block 300, the multi-modal browser performs the form entry logic, which involves enabling verbal commands that will be in "scope" (i.e., active) during the lifetime of the entire form. The field entry logic of function block 302 involves enabling verbal commands that will be in "scope" during the time the field is being read to the user. A test is made in decision block 304 to determine whether there is a value in the current field. If not, the multi-modal browser waits for user input in function block 308; otherwise, the multi-modal browser speaks the current value in the current field in function block 306 and proceeds to function block 308. A time out determination is made in decision block 310. If the field "times out" without any user input or previous value having been provided, the process loops back to the field entry logic 302. If user input has been provided, the multi-modal browser proceeds to the next field in function block 312.

Figure 4:
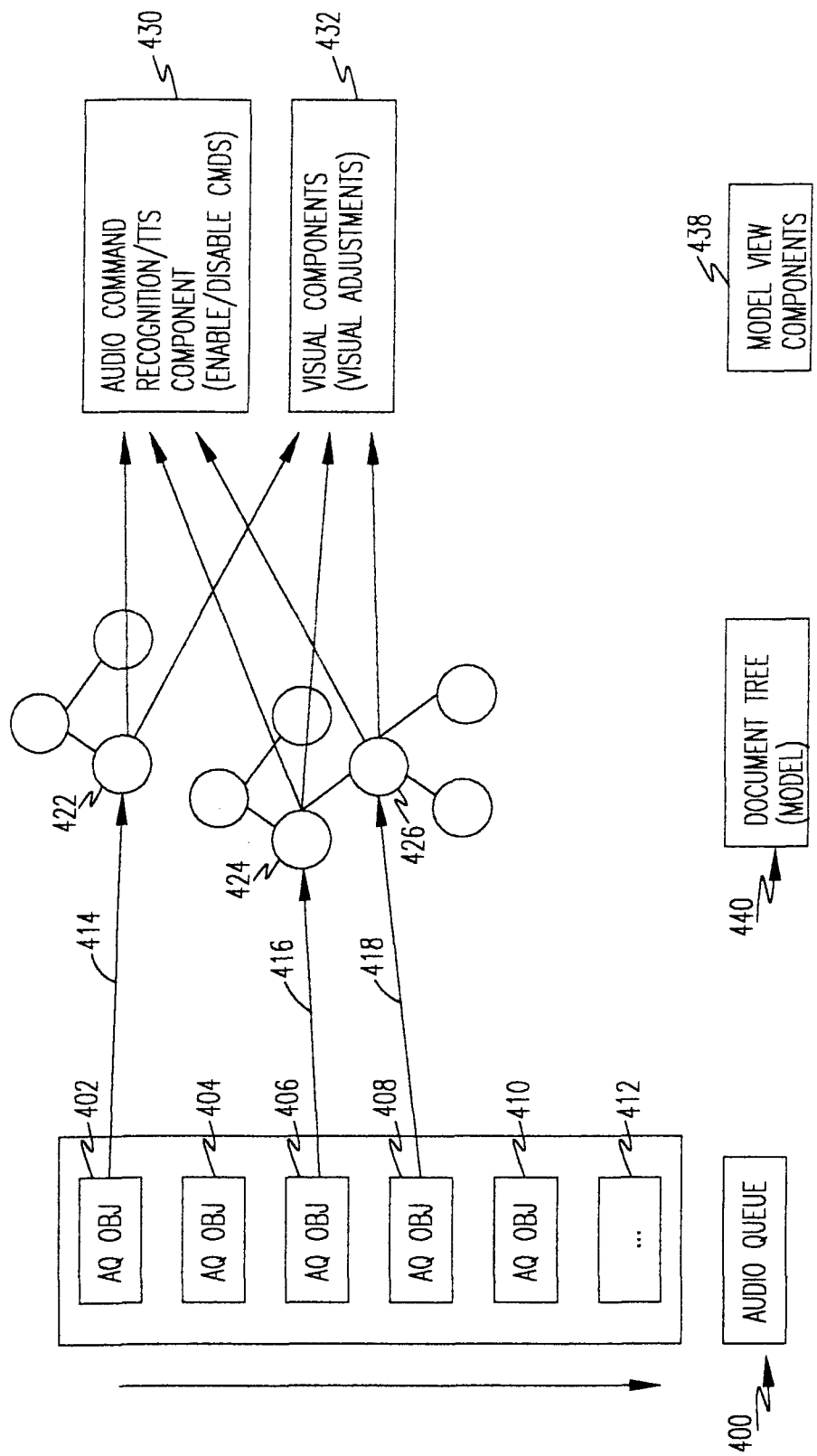
FIG. 4 is a diagram showing the relationship between an audio queue, document tree, and model view components.

The key to implementing this scheme is the audio queue, shown in FIG. 4. In general, the audio queue contains a series of objects that control the progression. For example, the audio queue may contain objects that:

a) contain the text to be spoken;
b) mark the entry to and/or exit from a form (200);
c) mark the entry/exit to a form element (202 and/or 204);
d) request an interruptible pause to the audio presentation; and
e) request a repositioning of the audio queue (including the ability to loop back and repeat part of the audio queue).

As will be appreciated by those skilled in the art, other objects having other functions may also be provided.

As shown in FIG. 4, buffers 402, 406 and 408 contain reference links 414, 416 and 418, respectively, to appropriate nodes in the model tree 440 that allow them to delegate control to the model node regarding how it should react based on the current condition of the audio/visual presentation. For example, when a form field 102 or 104 (as shown in FIG. 1) is encountered, the audio queue 400 entry node for the field requests the action to be taken.

An object in the audio queue 400 may determine whether the current value should be read, or provide an output to the user stating that "The current value is unspecified" from the controlling node in the model tree. This allows the audio queue 400 to be kept independent of the current state of the document. As will readily be recognized by those skilled in the art, FIG. 4 shows the relationship between the audio view 400, the document tree 440, and the model view components 438 of lines (1)-(23) of the code disclosed herein corresponding to FIG. 1.

Figure 5:
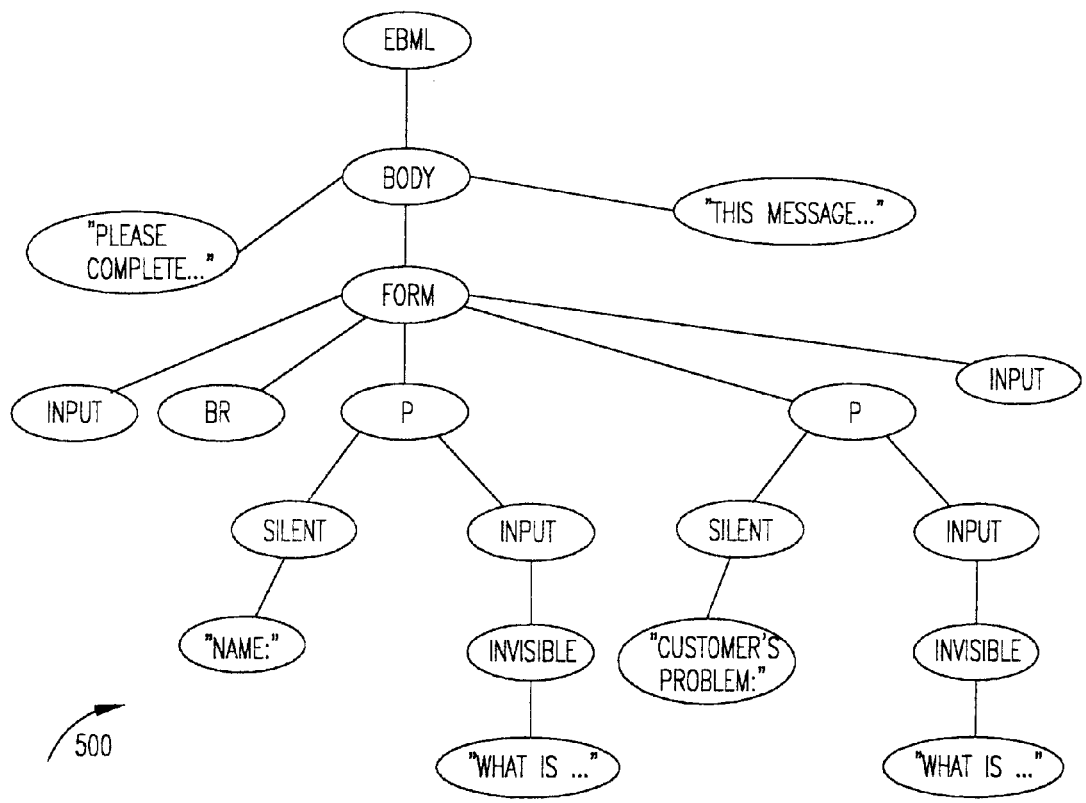
FIG. 5 shows how the document is parsed for processing and a view built for the audible and visual presentations.

FIG. 5 shows a parsed representation 500 of lines (1)-(23) of code corresponding to FIG. 1. As will be readily recognized by those skilled in the art, a parser contained within the multi-modal browser builds the representation. The parsed representation 500 is used to build the audio view 400 by traversing the document tree 440 tree (by pre-order traversal), shown in FIG. 4, which is responsible for providing the interaction with the form elements 102 and 104, shown in FIG. 1.

Figure 6:
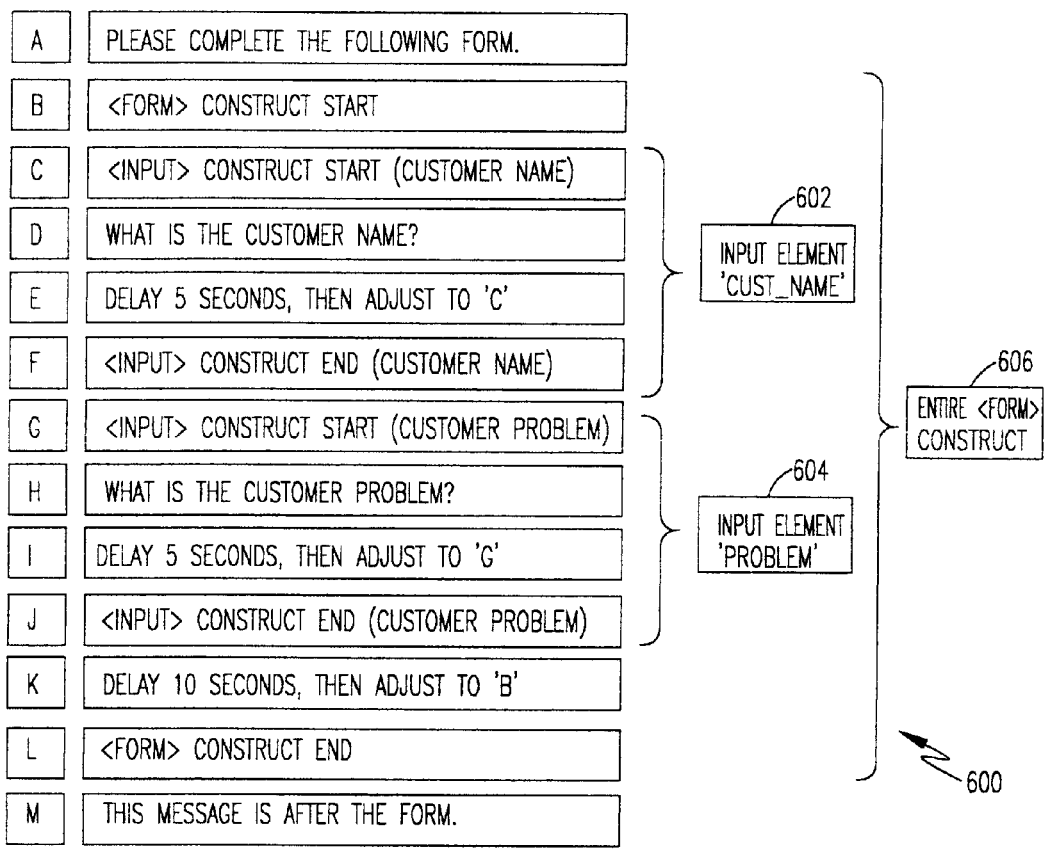
FIG. 6 is a diagram showing an example of an audio queue.

As shown in FIG. 6, the audio view 400 consists of a managed queue 600 of audio elements (A-M). The audio view 400 may be further divided into INPUT Elements 602 and 604, comprised of elements C-F and G-J, respectively. The Entire <FORM> construct 606, in turn, is comprised of elements B-L. As will be readily recognized by those skilled in the art, there are several types of audio elements, and the correct combination provides the desired behavior of the multi-modal browser. The types of audio elements include:

i) Output elements, which provide an audible presence within the managed queue. In a preferred embodiment, output elements can issue either Text To Speech (TTS) or recorded output (WAV files). However, it should be understood that other output formats can be used.
ii) Construct-entry elements provide a mechanism that allows visual synchronization and the enablement of commands considered local to the construct.
iii) Delay and adjust elements are inserted to temporarily delay the audible portion of the presentation. If left to expire, they jump to a new location within the queue.
iv) Construct-exit elements provide a mechanism allowing visual synchronization and the disablement of commands considered local to the construct.

Other threads can also effect the audio queue and its current position. This is done during the processing of command events (either verbal or tactile commands). For example, consider a speech recognition thread. When a speech command is recognized, it is done on a thread other than the thread doing the audio progression on behalf of the browser. This thread requests that the progress be stopped, re-positioned and then restarted. This is coordinated through the audio queue.

The audible presentation would begin with "A" and proceed until the delay "E". Threads responsible for processing audible/tactile commands have the ability to force progression of the audio queue to "F" should the input be satisfied or as a result of a user command to skip to the next field. When a construct start element is encountered, as shown in "C", the audio service thread will enable any commands considered local to that element. For example, the KEYBOARD command is meaningful while an INPUT TYPE=TEXT is in scope. Once the structure is no longer in scope, the command is disabled by the construct end audio element "F". The INPUT TYPE="SUBMIT", element has no presence on the audio element queue 600, but instead, registers commands with the <FORM> element directly. Any of its commands thus become <FORM> scope. When the <FORM> element comes into scope, as shown in "B", any commands known to it become enabled. Since the <FORM> itself is also considered a <FORM> element, a delay and adjust element is inserted before the construct end, as shown in "K".

This cycle will continue until the user invokes a command that causes the audio service thread to progress to the construct end element for the <FORM> element, as shown in "L".

While the invention has been described in terms of a single preferred embodiment, those skilled in the art will recognize that the invention can be practiced with modification within the spirit and scope of the appended claims.

Having thus described our invention, what we claim new and desire to secure by Letters Patent is as follows:

1. A method for completing a form, said method comprising:
    a client workstation storing an audiovisual form in a written markup language, said form defining fields with respective headings and respective blank areas to be updated with text;
    a web browser in said client workstation displaying said form with the respective headings and respective blank areas to be updated with text, audibly reading one of said headings and waiting for a user to audibly respond with corresponding text for the blank area associated with said one heading, wherein in response to said web browser progressing to said one heading, while said web browser audibly reads said one heading, said web browser automatically displaying a plurality of valid alternatives for said blank area associated with said one heading, one of said valid alternatives being said corresponding text;
    in response to said user speaking a command for the web browser to accept keyboard entry of said corresponding text, said web browser accepting subsequent entry of said corresponding text for said blank area associated with said one heading and displaying an updated state of the form with said one heading and with said corresponding text entered in said blank area associated with said one heading;
    in response to all fields in the form having been processed, said web browser generating a pause for a specified period of time; and
    in response to the specified period of time of the pause having expired, said web browser looping back to a top of the form.

2. The method of claim 1, said method further comprising:
    said web browser updating the written markup language for said form to include said corresponding text for said blank area associated with said one heading; and
    said web browser sending said updated written markup language to a server via a network.

3. The method of claim 2, said method further comprising:
    after said web browser performs the steps of updating the written markup language for said form and displaying an updated state of the form with said one heading and with said corresponding text typed in said blank area associated with said one heading, said web browser ceases to display said plurality of valid alternatives for said blank area, and subsequently, said web browser audibly reading another of said headings and waiting for a user to speak another text for the blank area associated with said other heading, and in response to said user speaking said other text, said web browser updating the written markup language for said form to include said other text for said blank area associated with said other heading and displaying an updated state of the form with said other heading and with said other text typed in said blank area associated with said other heading.

4. The method of claim 1, wherein in response to said web browser progressing to said one heading, while said web browser audibly reads said one heading, said method further comprising:
    said web browser automatically graphically indicating that said blank area associated with said one heading, and not any other blank area associated with any other heading, is currently waiting for said corresponding text from said user, and will include said corresponding text after spoken by said user.

5. The method of claim 1, said method further comprising:
    said web browser responding to a spoken command by said user to skip entry of text into said blank area associated with said one heading and advance to a next one of said fields, said user speaking next text for a blank area of said next one of said fields, and in response to said user speaking said next text for said blank area of said next one of said fields, said web browser updating the written markup language for said form to include said next text for said blank area for said next one of said fields and displaying an updated state of the form with said next text for said blank area for said next one of said fields entered in said blank area for said next one of said fields.

6. The method of claim 1, said method further comprising:
    after said displaying, said web browser proceeding from a first field with said one heading and said blank area associated with said one heading to a second field with a second heading and a second blank area associated with said second heading;
    after said proceeding to the second field and in response to said user speaking a skip command to skip from the second field to a third field with a third heading and a third blank area associated with said third heading, said web browser skipping from the second field to the third field.

7. The method of claim 1, said method further comprising:
    in response to said user speaking a review command, said web browser reviewing the form to determine whether all fields in the form contain information.

8. The method of claim 1, said method further comprising:
    in response to said user speaking a submit command, said web browser submitting the form to an application program to process the form.

9. The method of claim 1, said method further comprising:
    in response to said user speaking a cancel command, said web browser erasing information currently within a field in the form.

10. The method of claim 1, said method further comprising:
    after said displaying and in response to said user speaking a reset command, said web browser clearing information previously entered in the form and reprocessing the form, wherein said reprocessing comprises rereading the form to the user.

11. The method of claim 1, said method further comprising:
    after said displaying, said web browser proceeding from a first field with said one heading and said blank area associated with said one heading to a second field with a second heading and a second blank area associated with said second heading;
    in response to said proceeding to the second field, said web browser enabling a plurality of commands specific to the second field;

after the second field has been processed, said web browser proceeding from the second field to a third field with a third heading and a third blank area associated with said third heading; and after the second field has been processed and before said proceeding to the third field, said web browser disabling the plurality of commands specific to the second field.

* * * * *